(12) United States Patent
Bermel et al.

(10) Patent No.: US 8,369,670 B2
(45) Date of Patent: Feb. 5, 2013

(54) OPTICAL DEVICES HAVING CONTROLLED NONLINEARITY

(75) Inventors: Peter Bermel, Cambridge, MA (US); Alejandro Rodriguez, Boston, MA (US); Marin Soljacic, Belmont, MA (US); John Joannopoulos, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 255 days.

(21) Appl. No.: 12/596,709

(22) PCT Filed: May 1, 2008

(86) PCT No.: PCT/US2008/005614
§ 371 (c)(1),
(2), (4) Date: Sep. 15, 2010

(87) PCT Pub. No.: WO2009/005561
PCT Pub. Date: Jan. 8, 2009

(65) Prior Publication Data
US 2011/0002574 A1     Jan. 6, 2011

Related U.S. Application Data

(60) Provisional application No. 60/927,304, filed on May 2, 2007.

(51) Int. Cl.
*G02B 6/00* (2006.01)
(52) U.S. Cl. ............................... 385/122; 385/3
(58) Field of Classification Search ................ 385/3, 122
See application file for complete search history.

(56) References Cited

U.S. PATENT DOCUMENTS

| | | | | |
|---|---|---|---|---|
| 4,197,009 A | * | 4/1980 | Berry et al. | 356/301 |
| 5,317,666 A | * | 5/1994 | Agostinelli et al. | 385/122 |
| 5,335,240 A | | 8/1994 | Ho et al. | |
| 5,436,754 A | * | 7/1995 | Ishihara et al. | 359/240 |
| 5,887,103 A | * | 3/1999 | Jeong et al. | 385/122 |
| 5,943,464 A | * | 8/1999 | Khodja | 385/122 |
| 6,597,851 B2 | | 7/2003 | Johnson et al. | |

(Continued)

FOREIGN PATENT DOCUMENTS

JP     2005250429     9/2005

OTHER PUBLICATIONS

Evans, C.L., Potma, E., Xie, X., "Coherent anti-Stokes Raman Raman scattering spectral interferometry: determination of the real and imaginary components of nonlinear susceptibility x(3) for vibrational microscopy", Optics Lettes, vol. 29, No. 24, 2923-5, (2004).*

(Continued)

*Primary Examiner* — Charlie Peng
(74) *Attorney, Agent, or Firm* — Theresa A. Lober

(57) ABSTRACT

An optical device is provided having a solid state nonlinear material with a nanostructured extent, in at least one dimension, that is less than about 10 nm or that is at a temperature of less than about 77 K. An electronic band gap, $E_{Gap}$, of the material is at least about twice as large as an energy of a photon with a wavelength, $\lambda$, equal to an operational wavelength of the device. The material is characterized by a switching figure of merit, $\xi$, having a value that is at least about $2\pi$. A dielectric structure is around at least one dimension of the nonlinear material in a geometric arrangement having a characteristic photonic band gap that at least partially overlaps the electronic band gap of the material. At least one waveguide is disposed at the dielectric structure in sufficient proximity with the material for coupling light to the material.

35 Claims, 5 Drawing Sheets

U.S. PATENT DOCUMENTS

| | | | |
|---|---|---|---|
| 7,242,821 B2* | 7/2007 | Bull et al. | 385/2 |
| 7,532,384 B2 | 5/2009 | Bermel et al. | |
| 7,557,368 B2* | 7/2009 | Hegarty et al. | 257/21 |
| 7,768,694 B2 | 8/2010 | Rodriguez et al. | |
| 8,120,772 B2* | 2/2012 | Cicerone et al. | 356/301 |
| 2002/0067537 A1* | 6/2002 | Islam | 359/337 |
| 2003/0133677 A1 | 7/2003 | McCoy et al. | |
| 2004/0001665 A1 | 1/2004 | Zoorob | |
| 2004/0130777 A1* | 7/2004 | Islam | 359/334 |
| 2007/0189703 A1 | 8/2007 | Covey | |
| 2007/0280592 A1 | 12/2007 | Furuya et al. | |

OTHER PUBLICATIONS

Fork, "Physics of optical switching," Physical Review A, vol. 26, No. 4, pp. 2049-2064, Oct. 1982.

Yablonovitch, "Inhibited Spontaneous Emission in Solid-State Physics and Electronics," Physical Review Letters, vol. 58, No. 20, pp. 2059-2062, May 1987.

John et al., "Resonant Nonlinear Dielectric Response in a Photonic Band Gap Material," Physical Review Letters, vol. 76, No. 14, pp. 2484-2487, Apr. 1996.

John et al., "Optical bistability and phase transitions in a doped photonic band-gap material," Physical Review A, vol. 54, No. 5, pp. 4479-4488, Nov. 1996.

Lenz et al., "Large Kerr effect in bulk Se-based chalcogenide glasses," Optics Letters, vol. 25, No. 4, pp. 254-256, Feb. 2000.

Buljan et al., "White-light solitons," Optics Letters, vol. 28, No. 14, pp. 1239-1241, Jul. 2003.

Zhang et al., "Modified spontaneous emission of CdTe quantum dots inside a photonic crystal," Optical Letters, vol. 28, No. 16, pp. 1430-1432, Aug. 2003.

Yanik et al., "High-contrast all-optical bistable switching in photonic crystal microcavities," Applied Physics Letters, vol. 83, No. 14, pp. 2739-2741, Oct. 2003.

Bermel et al., "Properties of radiating pointlike sources in cylindrical omnidirectionally reflecting waveguides," Physical Review B, vol. 69, pp. 035316-1-035316-7, Jan. 2004.

Soljacic et al., "Enhancement of nonlinear effects using photonic crystals," nature materials, vol. 3, pp. 211, 219, Apr. 2004.

Lodahl et al., "Controlling the dynamics of spontaneous emission from quantum dots by photonic crystals," Nature, vol. 430, pp. 654-657, Aug. 2004.

Zhen-Hua et al., "Enhancement of absorptive optical nonlinearity of asymmetrically coupled quantum well structures," Chinese Physics, vol. 14, No. 4, pp. 812-817, Apr. 2005.

Englund et al., "Controlling the Spontaneous Emission Rate of Single Quantum Dots in a Two-Dimensional Photonic Crystal," Physical Review Letters, vol. 95, pp. 013904-1-013904-4, Jul. 2005.

Priem et al., "Impact of absorption mechanisms on Kerr-nonlinear resonator behavior," Journal of Applied Physics, vol. 99, pp. 063103-1-063103-8, Mar. 2006.

Bermel et al., "Single-photon all-optical switching using waveguide-cavity quantum electrodynamics," Physical Review A, vol. 74, pp. 043818-1-043818-5, Oct. 2006.

Bermel et al., "Tailoring Optical Nonlinearities via the Purcell Effect," Physical Review Letters, vol. 99, pp. 053601-1-053601-4, Aug. 2007.

Bravo-Abad et al., "Enhanced nonlinear optics in photonic-crystal microcavities," Optics Express, vol. 15, No. 24, pp. 16161-16176, Nov. 2007.

PCT/US2008/005614, International Search Report, First sheet, Second sheet—pp. 1-2, and patent family annex, Feb. 2009.

PCT/US2008/005614, Written Opinion of the International Searching Authority, Cover sheet, Form PCT/ISA/237, two pages, and Form PCT/ISA/237—Separate sheet—sheet 1- sheet 2, Feb. 2009.

Ikeda et al., "Material and structural criteria for ultra-fast Kerr nonlinear switching in optical resonant cavities," Solid-State Electronics, vol. 51, pp. 1376-1380, Aug. 2007.

Michler et al., "Nonradiative recombination via strongly localized defects in quantum wells," Physical Rev. B, vol. 49, No. 23, pp. 16 632-636, Jun. 1994.

Miller et al., "Band-Gap-Resonant Nonlinear Refraction in III-V Semiconductors," Phys. Rev. Letts., vol. 47, No. 3, pp. 197-200, Jul. 1981.

Tanabe et al., "All-optical switches on a silicon chip realized using photonic crystal nanocavities," App. Phys. Letts., vol. 87, pp. 151112 1-3, Oct. 2005.

Bayer et al., "Inhibition and Enhancement of the Spontaneous Emission of Quantum Dots in Structured Microresonators," Phys. Ref. Letts., vol. 86, pp. 3168-3171, Apr. 2001.

Boyd, "Nonlinear Optics," Chapter 6, pp. 277-328, Academic Press, New York, Dec. 1992.

Brokmann et al, "Measurement of the Radiative and Nonradiative Decay Rates of Single CdSe Nanocrystals through a Controlled Modification of Their Spontaneous Emission," Phys. Ref. Letts., vol. 93, pp. 107403 1-4, Sep. 2004.

Kleppner, "Inhibited Spontaneous Emission," Phys. Rev. Letts., vol. 47, pp. 233-236, Jul. 1981.

Kraiem et al, "Carrier dynamics in GaAs-A10.46Ga0.54As superlattice structure grown by molecular beam epitaxy," Optical Materials, vol. 17, pp. 305-309, Jun. 2001.

Purcell, "Spontaneous Emission Probabilities at Radio Frequencies," Physical Review, p. 681, B10, Jun. 1946.

* cited by examiner

OPTICAL DEVICES HAVING CONTROLLED NONLINEARITY

CROSS-REFERENCE TO RELATED APPLICATIONS

This application claims the benefit of U.S. Provisional Application No. 60/927,304, filed May 2, 2007, the entirety of which is hereby incorporated by reference.

STATEMENT REGARDING FEDERALLY SPONSORED RESEARCH

This invention was made with Government support under Contract No. DMR02-13282 awarded by NSF, Contract No. DE-FG02-97ER25308 awarded by DOE, and Contract No. DAAD-19-02-D0002 awarded by ARO. The Government has certain rights in the invention.

BACKGROUND OF INVENTION

This invention relates generally to optical devices, and more particularly relates to optical device nonlinearities.

An optical material can be characterized by its optical nonlinearity, which relates the nonlinear dependence of the polarization of the material to the optical field strength in the material. For example, the Kerr nonlinearity is distinguished by an index of refraction that depends linearly on the intensity of light present in the nonlinear material. Such a nonlinearity, and optical nonlinearities in general, enable a range of important optical phenomena, including frequency mixing, supercontinuum generation, and soliton propagation. Optical signal processing, such as higher-harmonic generation, and optical devices, such as optical switches, are fundamentally enabled by optical nonlinearities. For example, refractive index changes can be used to change the transmission characteristics of resonant cavities and other structures by modifying the effective optical path length of the structure or shifting the cavity resonances to alternate frequencies.

In general, optical nonlinearities are typically quite weak in an optical material. But many optical processing operations and optical devices cannot operate fully as-intended without a relatively strong nonlinearity. For example, optical bistable switching device power consumption, optical dispersion compensation strength, and two-beam coupling length all depend directly on the degree of nonlinearity of an optical material employed in a device or system. As a result, device characteristics are often adjusted in an attempt to enhance the nonlinearity of the optical device. For example, the geometry of an optical device can be tailored specifically for nonlinearity enhancement of the device. But although this approach does enhance nonlinearity, it typically also increases the characteristic quality factor of the device, which in turn decreases, e.g., the switching speed of the device. In an alternative strategy, the optical device material can be specifically selected primarily for the degree of nonlinearity exhibited by the material. But in general, highly nonlinear materials are characterized by other properties that are deleterious for optical processing. For example, many highly nonlinear materials are also characterized by a degree of optical absorption that is prohibitively high for many optical processing applications. Thus, even with optical device geometry and material design that are directed specifically to nonlinearity enhancement, the performance of optical processing and optical devices is constrained by the generally low nonlinearity of optical materials.

SUMMARY OF THE INVENTION

The invention provides optical device designs that control, in a predetermined manner, the optical nonlinearity of the device to tailor the nonlinearity of the device for achieving enhanced device performance. In one example device provided by the invention there is configured a solid state nonlinear material having a nanostructured extent, in at least one dimension, that is less than about 10 nm, or that is operated at a temperature of less than about 77 K. The nonlinear material has an electronic band gap, $E_{Gap}$, that is at least about twice as large as an energy of a photon with a wavelength, $\lambda$, equal to an operational wavelength of the device, such that $$E_{Gap} \geq 2\frac{hc}{\lambda},$$

where h is Plank's constant, c is the speed of light, and $\lambda$ is the operational wavelength of the optical device. The nonlinear material is further characterized by a switching figure of merit, $\xi$, having a value that is at least about $2\pi$, such that $\xi = \mathrm{Re}\chi^{(3)}/\mathrm{Im}\chi^{(3)} \geq 2\pi$, where $\mathrm{Re}\chi^{(3)}$ is nonlinear susceptibility real part and $\mathrm{Im}\chi^{(3)}$ is a nonlinear susceptibility imaginary part.

A dielectric structure is provided around at least one dimension of the nonlinear material in a geometric arrangement having a characteristic photonic band gap that at least partially overlaps the electronic band gap of the nonlinear material. At least one waveguide is provided at the dielectric structure in sufficient proximity with the nonlinear material for coupling light to the nonlinear material, and including input and output ports for directing incident light to the nonlinear material and for directing processed light away from the nonlinear material.

This device arrangement enables a wide range of optical device operations and configurations with operational capabilities not previously attainable. All-optical signal processing devices having operating powers and switching times that are orders of magnitude smaller than those corresponding to traditional nonlinear optical devices are thus attainable with the optical device configurations of the invention.

Other features and advantages of the invention will be apparent from the following description and accompanying figures, and from the claims.

DETAILED DESCRIPTION OF THE INVENTION

Figure 1:
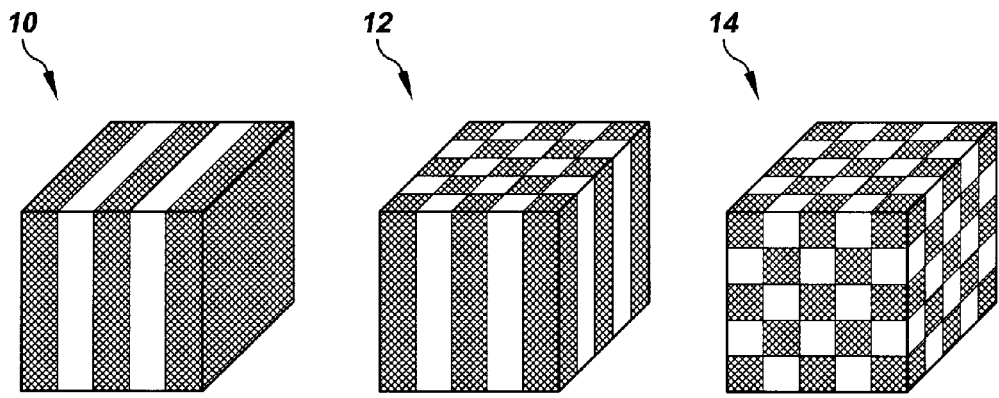
FIG. 1 is a schematic view of example one-dimensional, two-dimensional, and three-dimensional photonic crystals that can be employed in the nonlinear optical devices of the invention.

To consider the operation of optically nonlinear devices enabled by the invention in detail, the Kerr nonlinearity is specifically analyzed as an exemplary nonlinearity, but it is to be recognized that the invention is not limited to Kerr materials, as explained below. A generic model of an optical material that is characterized by a Kerr nonlinearity is a two-level system in which emission from an upper level, b, to a lower level, a, can occur. The nonlinear susceptibility of this material can then be determined by considering the system as a collection of a number, N, of two-level systems per unit volume that are provided in an environment with a controlled electromagnetic field that can impact the system, such as in a photonic crystal cavity.

The corresponding complex Kerr nonlinear susceptibility, $\chi^{(3)}$, can be expressed in the steady state limit, based on the rotating wave approximation, as:

$$\chi^{(3)} = \frac{4}{3} N \mu^4 \frac{T_1 T_2^2 (\Delta T_2 - i)}{\hbar^3 (1 + \Delta^2 T_2^2)^2}; \quad (1)$$

where N is the number of two-level systems, $\mu$ is their dipole moment, $T_1^{-1}$ is the rate of population decay from the upper level to the lower level, $T_2^{-1} = (\frac{1}{2}) T_1^{-1} + \gamma_{phase}$ is the rate of phase damping, and $\Delta \equiv \omega - \omega_{ba}$ is the detuning of an incoming wave of frequency $\omega$ from the electronic resonance frequency $\omega_{ba}$ of the two-level cavity system in the photonic crystal. For large detunings, where it is given that $\Delta T_2 \gg 1$, one obtains the approximation that:

$$\text{Re}\chi^{(3)} \approx \frac{4}{3} N \mu^4 \left(\frac{1}{\hbar \Delta}\right)^3 \frac{T_1}{T_2}. \quad (2)$$

where $T_1$ is the lifetime of the population of the excited level and $T_2$ is the phase coherence time. For materials that can be treated as two-level systems with the energies of the two levels given by conduction and valence band energies, as in a band-gapped material such as a semiconductor, this approximation for the $\chi^{(3)}$ Kerr nonlinear susceptibility yields reasonable agreement with experiment.

For this case, the parameter $\Delta$ can be defined in terms of the band gap frequency such that $\Delta \equiv \omega_G - \omega$, where $\omega_G$ is electronic resonance frequency of the band gap of the system.

Then for the regime $\Delta T_2 \gg 1$ of expression (2) above, the $\chi^{(3)}$ Kerr nonlinear susceptibility of the semiconductor is given as:

$$\text{Re}\chi^{(3)} \approx -\frac{1}{30\pi\hbar^3}\left(\frac{eP}{\hbar\omega}\right)^4\left(\frac{2m_r}{\hbar\Delta}\right)^{3/2}\frac{T_1}{T_2}; \quad (3)$$

where P is a matrix element, and $m_r$ is the reduced effective mass of the exciton. This expression includes the same scaling with lifetimes as expression (2) above, and thus it is understood that the control of the nonlinearity of a semiconductor follows the general model of expression (2) above.

In accordance with the invention, the spontaneous emission properties of the Kerr nonlinear material modeled by expressions (1-3) above are controlled to tailor the effective Kerr nonlinearity of the material. Spontaneous emission is a quantum mechanical process by which a light source e.g., an atom, molecule, nanocrystal, or nucleus, or other source in an excited energy state, or level, decays to a lower energy level via the emission of a photon.

It is understood that the rate of spontaneous emission depends in part on the dielectric environment surrounding the light source. The Purcell effect defines this dependence as an ability to modify the rate of spontaneous emission by the characteristics of the surrounding dielectric environment or dielectric structure. A dielectric environment or structure here refers to a material or structure having a characteristic index of refraction.

When spontaneous emission from an excited energy level in a nonlinear material is substantially suppressed, then $T_1$, the lifetime of the population of the excited level, becomes large, while $T_2$, the phase coherence time, remains relatively small and finite. Expressions (2) and (3) above demonstrate that the Kerr nonlinear susceptibility, $\chi^{(3)}$, is directly proportional to the ratio of $T_1/T_2$, for large detunings, where $\Delta T_{2,vac} \gg 1$. For this case, $T_2 \approx \gamma_{phase}^{-1}$, and $T_2$ remains nearly unchanged even if $T_1$ is increased by suppression of spontaneous emission.

In accordance with the invention, this condition is exploited by the controlled suppression of spontaneous emission from an excited energy level in a nonlinear material to directly enhance the Kerr nonlinearity of the material. Physically, the enhanced nonlinearity results from spontaneous emission suppression because the increased lifetime of the excited level population, $T_{1,Purcell}$, increases the virtual lifetime for nonlinear processes to occur in the optical material.

The enhancement, $\eta$, of the real part of the Kerr nonlinear susceptibility, $\chi^{(3)}$, that is achieved in accordance with the invention by suppression of spontaneous emission can be expressed as:

$$\eta = \text{Re}\chi_{purcell}^{(3)}/\text{Re}\chi_{hom}^{(3)} \quad (4)$$

where $\chi_{purcell}^{(3)}$ is the Kerr nonlinear susceptibility modified by the Purcell effect and $\chi_{hom}^{(3)}$ is the nonlinear susceptibility in a homogeneous medium. Because the decay rate of the excited level population, $T_1^{-1} = \Gamma_{rad} + \Gamma_{nr}$, where $\Gamma_{rad}$ is the radiative decay rate in vacuum and $\Gamma_{nr}$ is the non-radiative decay rate in vacuum, then the maximum enhancement, $\eta$, of the nonlinear susceptibility that can be attained is given as:

$$\eta \approx \frac{T_{1,purcell} T_{2,vac}}{T_{1,hom} T_{2,purcell}} = \frac{\frac{1}{2}\Gamma_{nr} + \gamma_{phase}}{\frac{1}{2}(\Gamma_{nr} + \Gamma_{rad}) + \gamma_{phase}} \frac{\Gamma_{rad} + \Gamma_{nr}}{\Gamma_{nr}}, \quad (5)$$

where $T_{1,Purcell}$ is the lifetime of the population of the excited level with suppression of spontaneous emission, $T_{1,hom}$, is the lifetime of the population of the excited level without suppression of spontaneous emission, $T_{2,Purcell}$ is the phase coherence time with suppression of spontaneous emission, and $T_{2,hom}$ is the phase coherence time without suppression of spontaneous emission. As discussed in detail below, this enhancement can result in a Kerr nonlinear susceptibility, $\chi^{(3)}$, that is increased by up to one or more orders of magnitude for selected system characteristics.

The rate of phase damping in the system being controlled is important for enabling the nonlinearity enhancement of the invention, because in the radiatively broadened limit that phase damping is controlled exclusively by the spontaneous emission rate, i.e., where $T_2 \approx 2T_1$, the ratio $T_1/T_2$ is not altered by changes in spontaneous emission, and therefore, the nonlinearity will revert to its normal value for large detunings, characteristic of an operational regime in which lossless switching can take place. In other words, because the Kerr nonlinearity, $\chi^{(3)}$, results from the polarization of an optical medium, the nonlinearity depends significantly on phase coherence time, $T_2$, and the absence of phase damping effects causes any enhancement effects to disappear. On the other hand, the presence of large phase damping effects makes $T_2$ effectively constant, resulting in the desired suppression of spontaneous emission The enhanced Kerr nonlinearity does not generally increase the relative nonlinear losses of an optical device employing the nonlinear material. The nonlinear switching figure of merit, $\xi$, can be expressed as $\xi = \text{Re}\chi^{(3)}/\text{Im}\chi^{(3)}$. The ratio of the nonlinear switching figure of merit under Purcell effect control, $\xi_{Purcell}$, to the uncontrolled nonlinear switching figure of merit, $\xi_{vac}$, given as $\xi_{purcell}/\xi_{vacuum} = T_{2,purcell}/T_{2,vacuum} \geq 1$, for all cases of suppressed spontaneous emission. Therefore, relative nonlinear loss, a critical operational parameter in all-optical signal processing, is found to not be increased by the nonlinear enhancement of the invention.

The Purcell effect can be imposed in accordance with the invention to enhance, rather than suppress, spontaneous emission and accordingly to decrease allowed virtual lifetime, to reduce the likelihood of nonlinear processes to occur. For this case of Purcell enhancement, the lifetime of the excited level population, $T_1$, is caused to decrease while the phase coherence time, $T_2$, may not change as rapidly, due to the constant contribution of phase damping effects. This applies in the regime where $T_1 \gg \gamma_{phase}^{-1}$. Otherwise, for sufficiently small $T_1$, $T_2$ scales in the same way and $\chi^{(3)}$ remains approximately constant for large detunings, where $\Delta T_2 \gg 1$. This condition enables the suppression of nonlinearities in optical materials and structures.

In general, optical devices designed with enhanced nonlinearity in accordance with the invention can operate with a nonlinear material where the local density of states of the material can be substantially modified, given operation in the weak-coupling regime. For many optical device applications, the nonlinear material to be controlled preferably is characterized by the Kerr nonlinearity, but can be characterized in an alternative class of materials, e.g., as a Pockels material, in which a change in refractive index is proportional to the amplitude of an applied field, or other nonlinearity. The invention is not limited to a particular material or class of materials, but rather, provides optical device configurations that include a material displaying a proportionality to $T_1$, the lifetime of excited level(s) that are responsible for the nonlinearity of the material.

For many integrated optical circuit devices and applications, the nonlinear material is preferably a solid state material having an electronic band gap. As explained above, the two-level model for determining the Kerr nonlinearity holds true for a wide range of nonlinear materials that can be described as having a band gap, e.g., semiconductors, insulators, and glasses. There exist materials within each of these classes that can provide the requisite condition of supporting a characteristic resonant excitation for the optical processing with enhanced nonlinearity in accordance with the invention.

Further, as was made clear in the discussion above, the nonlinear material preferably is characterized by a dephasing rate that is much greater than the rate of excited state population decay. This property is present almost universally in solid state band gap materials at room temperature.

Given a selected wavelength of interest for optical device processing, the nonlinear band gap material to be employed in the optical device of the invention is characterized by a corresponding band gap that supports the wavelength of interest, $\lambda$, i.e., the operational wavelength of the optical device. This correspondence for the energy of the band gap, $E_{Gap}$, and operational wavelength, $\lambda$, is given as:

$$E_{Gap} \geq 2\frac{hc}{\lambda}, \qquad (6)$$

where h is Plank's constant and c is the speed of light. This condition provides that the energy gap in the two-level system of the nonlinear material is at least about twice as large as the energy of a photon having a wavelength, $\lambda$, that is equal to the operational wavelength of the device, and therefore is sufficient for the energy of the light being processed by the device.

The invention provides optical devices having operational wavelengths for a wide range of applications. Optical devices in accordance with the invention can be operated for visible wavelengths of between about 400 nm-875 nm. Further, optical devices in accordance with the invention can be operated for IR wavelengths of between about 1290 nm-1330 nm. In the telecommunications wavelength bands, the C-band, at between about 1530 nm-1575 nm, and the L-band, at between about 1575 nm-1610 nm can all be accommodated by the optical devices of the invention, which can be designed with the nonlinear materials of the invention to operate within one of these selected wavelength ranges.

To operate successfully in an enhanced-nonlinearity optical device, the nonlinear material must support the device operation, e.g., switching, with minimal losses. In principle, any degree of linear loss can be overcome by sufficiently high input light intensity to achieve, e.g., switching. But for nonlinear materials in which nonlinear losses scale with intensity in the manner of the refractive index of a material, such does not follow.

It is therefore required in general for nonlinear materials of the invention that switching be accomplished under some maximum allowable absorption, whereby a shift in the frequency of the mode that exists in the nonlinear material is larger than the rate of absorption for the material. This can be quantified with respect to the Kerr nonlinear switching figure of merit, $\xi$, discussed above. To operate in an optical device in accordance with the invention as, e.g., a switching medium, the selected nonlinear material must be characterized by a Kerr nonlinear switching figure of merit, $\xi$, having a value that is at least about $2\pi$, restated here as:

$$\xi = \text{Re}\chi^{(3)}/\text{Im}\chi^{(3)} \geq 2\pi, \qquad (7)$$

where $\text{Re}\chi^{(3)}$ is the real part of $\chi^{(3)}$ given by expression (1) above and $\text{Im}\chi^{(3)}$ is the imaginary part of $\chi^{(3)}$ given by expression (1) above. In other words, the switching figure of merit given by expression (7) above must be at or above about $2\pi$ for the nonlinear material to be capable of producing a phase shift that is sufficient for switching given the absorption coefficient of the material.

In practice, the real and imaginary parts of the Kerr nonlinear susceptibility, $\chi^{(3)}$, can be experimentally measured to determine if a given material meets the criterion of expression (7) above. For example, the conventional z-scan measurement technique can be employed for measuring the Kerr nonlinearity of a material. In this technique, a sample of the material of interest is moved through the focus of a laser beam and the beam radius is measured at some point behind the focus as a function of the material position. From the measured dependence of the detected laser signal on the sample position, the magnitude of the Kerr nonlinearity can be determined. Based on expression (7) above, this measurement in turn determines if a nonlinear material of interest has a sufficiently high switching figure of merit to be employed in accordance with the invention.

To operate in an enhanced-nonlinearity device in accordance with the invention, a nonlinear material further is required to exhibit a low nonradiative decay rate, $\Gamma_{NR}$, relative to a characteristic radiative decay rate, $\Gamma_{RAD}$, in vacuum. This condition corresponds to limiting the effects of thermal agitation in the material. In general, this condition does not naturally occur for bulk materials at room temperature. The condition can be achieved, however, for a bulk material by device operation at temperatures sufficiently low to substantially decrease thermal energy; for example, at an operational temperature that is no more than about 77 K. Note that it is the nonlinear material that is to be maintained at the low temperature.

Alternatively, the effects of thermal agitation can be artificially inhibited by manipulation of the nonradiative recombination rate through nanostructuring of a bulk material in accordance with the invention. Such nanostructuring is employed to manipulate the phonon spectrum of the nonlinear material such that the nonradiative decay rate is reduced. Nanostructuring of a bulk material to reduce the nonradiative decay rate of the material can be achieved in accordance with the invention by imposing on the material features having a characteristic feature size that is, e.g., no more than about 10 nm. That is, the nonlinear material is required to be characterized by an extent in at least one dimension that is $\leq$10 nm.

Quantum wells, multiple quantum wells, quantum wires, quantum dots, nanocrystals, or other nanofeatures, provided alone or as a combination of features, can be employed to achieve nanostructuring that is sufficient for suppressing nonradiative decay to a degree below the nonradiative decay that is required for a given optical device operation. At the boundary of a feature having an extent that is $\leq$10 nm it is required that there occur a difference in electronic band structure across the boundary. For example, there can be provided a shift in conduction band energy at the feature boundary. In a quantum well or multiple quantum well structure, e.g., each material layer forming a quantum well can be characterized by a $\leq$10 nm nanostructured thickness. Across the boundary between quantum well layers, the conduction bands of the quantum well materials can here be specified to be shifted by an energy that is at least as large as the thermal energy at room temperature, 0.025 eV, to sufficiently reduce nonradiative recombination.

In a quantum wire, two dimensions can be controlled to an extent $\leq$10 nm, e.g., with a quantum wire radius that is $\leq$5 nm. In a quantum dot, all dimensions can be controlled to an extent $\leq$10 nm, e.g., with a quantum dot radius of $\leq$5 nm. Quantum dots can be provided in, e.g., a selected insulating medium.

Now considering specific materials that can be particularly well-suited for the nonlinear optical devices of the invention, materials that meet the criteria described above as well as being characterized by a relatively high inherent nonlinearity susceptibility, $\chi^{(3)}$, can be preferred. Given a mid-infrared wavelength of input light, $\lambda$, as the operational wavelength of the device, indium antimonide (InSb), either nanostructured or operated at T=77 K can be employed, having a characteristic $\chi^{(3)}\approx0.3$ at $\lambda$=5.4 μm and T=77 K. A combinations of gallium arsenide (GaAs) and alloys of aluminum gallium arsenide (AlGaAs), provided, e.g., in a nanostructured, multiple quantum well structure, can be employed for applications at near infrared wavelengths, with on-resonance $\chi^{(3)}\approx0.04$, or bulk GaAs at T=77 K, where on-resonance $\chi^{(3)}\approx6.5\times10^{-4}$. Aluminum gallium indium phosphide (AlGaInP) can be employed for visible wavelengths greater than 620 nm.

For telecommunication wavelengths at about 1.55 μm, AlGaAs alloys can be particularly well-suited. For example, $Al_xGa_{1-x}As$, where, e.g., x=0.18 or 0.36, provides the ability to form multiple quantum wells with alternating values of x, both of which exhibit strong nonlinearities (with x=0.18, $\chi^{(3)}\approx5.0\times10^{-11}$; with x=0.36, $\chi^{(3)}\approx1.9\times10^{-11}$) and a high switching figure of merit. Other such materials for use at telecommunication wavelengths include lithium niobate (LiNbO$_3$), with nonlinear coefficients $r_{33}$=30.9 pm/V, $r_{13}$=9.6 pm/V, $r_{22}$=6.8 pm/V, and $r_{42}$=32.6 pm/V. Lithium tantalate (LiTaO$_3$), with $r_{13}$=8.4 pm/V, $r_{33}$=30.5 pm/V, $r_{22}$=−0.2 pm/V, and $r_{51}$=20 pm/V can also be employed.

Other band gap materials displaying the required properties, particularly low nonlinear absorption, include a range of II-VI semiconductors, e.g., cadmium telluride (CdTe), with $\chi^{(3)}\approx7.7\times10^{-11}$ at telecommunication wavelengths, zinc telluride (ZnTe), with $\chi^{(3)}\approx3.3\times10^{-12}$ at telecommunication wavelengths, cadmium selenide (CdSe), cadmium sulfide (CdS), zinc selenide (ZnSe), and zinc sulfide (ZnS), as well as tertiary and quarternary combinations thereof; other III-V semiconductor materials not mentioned previously, e.g., aluminum phosphide (AlP), gallium phosphide (GaP), indium phosphide (InP), aluminum antimonide (AlSb), and gallium nitride (GaN); group IV semiconductors such as silicon (Si), with $\chi^{(3)}\approx1.4\times10^{-11}$ at telecommunication wavelengths, silicon carbide (SiC), and germanium (Ge); and other band gap materials.

Insulating materials that can be employed must display sufficient nonlinear coefficients at the operating wavelengths of interest in the visible or infrared, and include semiconductor-doped glasses containing, e.g., II-VI or III-V semiconductor nanocrystals, having a Kerr nonlinearity of $\chi_{1111}^{(3)}\approx10^{-8}$; optical glasses, with $\chi_{1111}^{(3)}\approx(1-100)\times10^{-14}$, e.g., leaded glass, rutile glass, titanium oxide glass, tellurite glass, and niobium glass; organic materials such as polydiacetylene, with $\chi_{1111}^{(3)}\approx2.5\times10^{-10}$, phthalocyanine dyes, and J-aggregates; insulating crystals, e.g., silicon dioxide or silica (SiO$_2$), with $\chi_{1111}^{(3)}\approx1.2\times10^{-14}$ at telecommunication wavelengths, aluminum oxide or sapphire (Al$_2$O$_3$), with $\chi_{1111}^{(3)}\approx2.1\times10^{-14}$ at telecommunication wavelengths, potassium bromide (KBr) with $\chi_{1111}^{(3)}\approx4.7\times10^{-14}$ at telecommunication wavelengths, calcite (CaCO$_3$) with $\chi_{1111}^{(3)}\approx1.8\times10^{-14}$ at telecommunication wavelengths, and other materials.

Whatever nonlinear material is selected, the material preferably provides the band gap energy, switching figure of merit, and nonradiative decay characteristics described above to enable enhanced-nonlinearity device operation in accordance with the invention.

To produce a selected nonlinearity-enhanced optical device in accordance with the invention, a selected nonlinear material is disposed at a dielectric structure or environment that suppresses the spontaneous emission of the nonlinear material to enhance the nonlinearity in the manner described above. A range of structures and material arrangements can be employed to provide this dielectric environment. In each case, the dimensions and dielectric characteristics of the dielectric structure are selected such that an electromagnetic mode cannot exist at the resonant frequency that is characteristic of the electronic band gap of the nonlinear material at the location of the nonlinear material at the dielectric environment.

A first example class of dielectric environments to be employed in accordance with the invention is the class of photonic crystals. A photonic crystal is a dielectric structure having a periodic, i.e., repeating, arrangement of alternating high-dielectric and low-dielectric regions. With sufficient index contrast and appropriate lattice structure, e.g., face-centered cubic arrangement of dielectric regions, a photonic band gap is produced in the photonic crystal. Propagation of light through the crystal within the photonic band gap is exponentially suppressed; in other words, a range of frequencies of light cannot propagate through the crystal, and that prohibited frequency range is characterized by the photonic band gap.

Conventionally, the periodicity of a photonic crystal lattice and the dimensions of the dielectric regions in the lattice are selected to suppress the propagation in the crystal of a selected incident wavelength for a given optical application. In accordance with the invention, the periodicity of the crystal is instead selected to suppress spontaneous emission from a nonlinear material that is disposed within the crystal lattice, at the wavelength, or frequency, that is characteristic of the electronic band gap of the nonlinear material disposed within the crystal in the manner described below. This crystal lattice design in effect matches the photonic band gap of the crystal with the electronic band gap of the nonlinear material; the photonic band gap at least partially overlaps the electronic band gap. As a result, the local density of states, and corresponding spontaneous emission, in the nonlinear material is suppressed and the nonlinearity of the material is enhanced.

The photonic crystal can be provided in any suitable number of dimensions and configuration. Referring to FIG. 1, photonic crystals can be provided as a one-dimensional photonic crystal 10, a two-dimensional photonic crystal 12, or three-dimensional photonic crystal structure 14, each having a correspondingly dimensioned photonic band gap. The photonic crystal is formed of a selected material or materials that produce the requisite dielectric environment for modifying the nonlinearity of a selected nonlinear material.

The high- and low-dielectric regions can be provided as distinct solid state materials or as a selected solid state material in air. For example, Si and $SiO_2$ can be employed as the alternating high- and low-dielectric regions in a photonic crystal of one, two, or three dimensions. An example three-dimensional periodic dielectric structure of Si and $SiO_2$ alternating dielectric regions can be produced e.g., in the manner described in U.S. Pat. No. 6,597,851, entitled "Periodic Dielectric Structure Having a Complete Three-Dimensional Photonic Band Gap," the entirety of which is hereby incorporated by reference. Corresponding one- and two-dimensional photonic crystals can similarly be produced of two distinct solid state materials. Alternatively, as described in detail below, dielectric rods arranged in a matrix surrounded by ambient air, or a lattice of air holes in a dielectric material, can be employed to form alternating high- and low-dielectric regions of a periodic structure.

Figure 2:
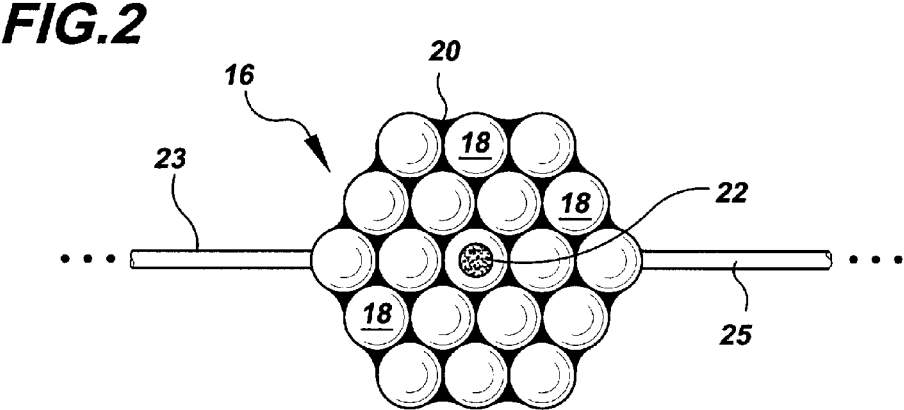
FIG. 2 is a schematic view of a first example two-dimensional photonic crystal having a nonlinear material configured in the crystal to enhance the material's nonlinearity in accordance with the invention.

A selected nonlinear material is arranged with the photonic crystal to enable the suppression of spontaneous emission of the nonlinear material. The photonic crystal is provided around the nonlinear material in at least one dimension of the extent of the nonlinear material. This arrangement can be provided in a number of configurations. In a first example configuration, a selected nonlinear material is provided at the location of one or more of the high-dielectric regions or low-dielectric regions of the photonic crystal. Referring to FIG. 2, in a first example configuration of this arrangement, there is provided a selected photonic crystal, e.g., a two-dimensional photonic crystal 16, consisting of, e.g., a two-dimensional triangular lattice of low-dielectric regions 18 in a high-dielectric material 20. The high-dielectric medium for many applications is provided as a semiconductor material with an electronic band gap larger than the operating frequency, such as Si ($n\approx3.5$), GaAs ($n\approx3.3$), AlGaAs ($n\approx3.3$), Ge ($n\approx4.0$), or an insulator fulfilling the same requirement, such as titanium dioxide ($n\approx2.9$). The low-dielectric medium is provided, for many applications, as, e.g., air or an insulating material, such as $SiO_2$ ($n\approx1.5$), $Al_2O_3$ ($n\approx1.76$), magnesium fluoride ($MgF_2$, $n\approx1.4$), or other suitable insulating material. The figure illustrates a planar slice of the example two-dimensional photonic crystal 16. In this arrangement, a nonlinear material 22 is substituted for one of the low-dielectric regions 18 at the center of the periodic crystal lattice 16. The nonlinear material can be provided as a bulk material, e.g., InSb, and can be provided as a material that is nanostructured by, e.g., quantum wells, quantum dots, or other nanostructured arrangement. Waveguides 23, 25 are provided at the dielectric structure to provide input and output ports for directing light to the nonlinear material and away from the nonlinear material.

In an alternative configuration, a selected nonlinear material can be substituted for a region of the high-dielectric material 20, rather than the low-dielectric material as in FIG. 2. In either of these configurations, the nonlinear material also serves as a photonic crystal material. It will be understood that this arrangement can be directly extended to one- and three-dimensional crystals. The nonlinear material can be provided at the site of either the high- or low-dielectric material, wholly or in part.

Figure 3:
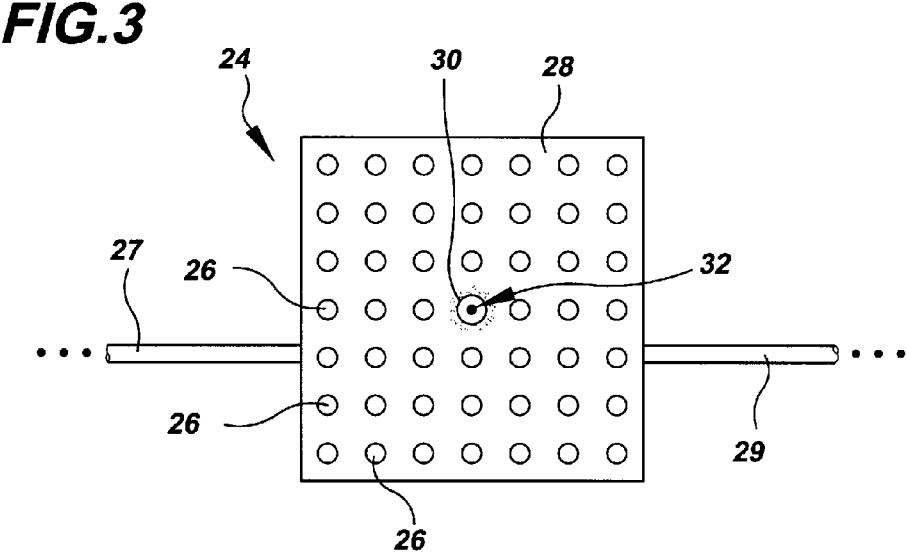
FIG. 3 a schematic view of a second example two-dimensional photonic crystal having a nonlinear material configured in the crystal to enhance the material's nonlinearity in accordance with the invention.

Now referring to FIG. 3, in a second example configuration, there is provided a selected photonic crystal, e.g., a two-dimensional photonic crystal 24, consisting of, e.g., a two-dimensional square lattice of dielectric rods 26 in air 28. The figure illustrates a planar slice of the example two-dimensional photonic crystal slab 24. In this arrangement, a defect position 30 is provided at the center of the lattice. The defect position is characterized by a radius that is about 1.4 times the radius of the dielectric rods 26. A nonlinear material 32 fills the entirety of the defect position 30. Waveguides 27, 29 are provided for coupling light to the nonlinear material and for providing input and output ports to the optical device.

In the example configuration of FIG. 2, the crystal lattice periodicity is maintained and the nonlinear material is substituted for a region of the lattice. In the example configuration of FIG. 3, the periodicity of the lattice is disrupted in one or more dimensions and the nonlinear material is provided at the site of the lattice disruption. This configuration can be extended to provide a nonlinear cavity within a photonic crystal, with the site of the nonlinear cavity disrupting the lattice. In this third example configuration including a nonlinear cavity, the physical dimensions of the cavity are selected to provide the modes of interest and the cavity is disposed in the crystal lattice, with the cavity disrupting the periodicity of the lattice at its location.

Figure 4:
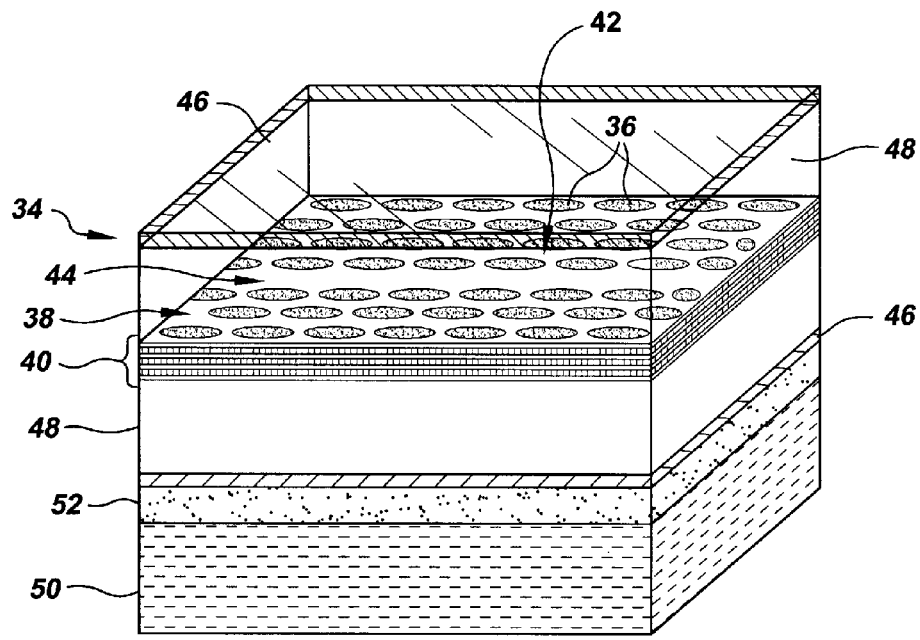
FIG. 4 is a schematic view of an example of a nonlinear optical switch provided by the invention, including a multiple quantum well nonlinear material cavity configured in a two-dimensional photonic crystal slab.

Referring to FIG. 4, in an example of this configuration there is provided a selected photonic crystal, e.g., a two-dimensional photonic crystal slab 34, consisting of, e.g., a two-dimensional lattice of circular low-dielectric regions 36 in a photonic crystal medium 38. Here the high-index crystal medium 38 is provided as the nonlinear material system itself, and is nanostructured as layers 40 of selected nonlinear materials forming multiple quantum wells. An insulating medium 48 serves as the low-index region of the two-dimensional photonic crystal slab 34. A nonlinear cavity 42 is provided in the lattice, disrupting the periodicity of holes at the site of the lattice. Further details of this photonic crystal structure are described below.

As discussed above, for any photonic crystal geometry or other dielectric structure, it is required to provide a coupling element that delivers input light in proximity to the nonlinear material for coupling with the nonlinear material. For many applications, the coupling configuration in the crystal of FIG. 4 can be particularly advantageous. Here a one-dimensional defect in the crystal lattice is provided as a waveguide 44 for coupling input light with the nonlinear cavity 42. A similar one-dimensional waveguide can be provided in the two-dimensional photonic crystals of FIGS. 2 and 3 in an alternative to the optical fibers shown in those figures. For each of these arrangements, the waveguide can be integrated in the crystal to enable incident light to be delivered to and to couple with nonlinear material that is disposed at an interior site of the crystal.

This coupling enables the crystal and nonlinear material to be configured for a selected device operation on the incident light. With a waveguide provided in the photonic crystal, conventional optical fiber or other coupling can be employed to direct incident light to the photonic crystal and the vicinity of the nonlinear material. A waveguide can alternatively be provided on a substrate or other platform in the vicinity of the photonic crystal, or can be provided as an optical fiber adjacent to the crystal. No particular coupling medium is required; it is necessary only that incident light to be processed by an optical device of the invention be brought sufficiently close to the nonlinear material for the optical field to couple with the material. A distance of about 4 evanescent lengths between a waveguide and the nonlinear material is in general sufficient for coupling light between the waveguide and the nonlinear material.

To maximize the enhancement of a material's nonlinearity, the spontaneous emission from the nonlinear material is optimally suppressed in all directions, i.e., the suppression is three-dimensional. This three-dimensional suppression can be achieved directly by a three-dimensional photonic crystal in which a nonlinear material is disposed at an interior site of the crystal. But for more practical arrangements, such as two-dimensional photonic crystal slabs, emission from a nonlinear material is suppressed only in two dimensions. Therefore, in accordance with the invention, a reflecting surface is to be provided at the edges of a photonic crystal at which emission from the nonlinear material could escape. As explained above, in general, in accordance with the invention, a photonic crystal is to be provided around a nonlinear material in at least one dimension of the nonlinear material. With this condition met, a photonic crystal medium or combination of photonic crystal medium and reflector are to be provided around at least two dimensions of the nonlinear material to achieve three-dimensional suppression.

Referring to the photonic crystal arrangement of FIG. 4, this condition is met by the provision of a metallic layer 46 above and below the crystal slab 40. The metallic layers 46 are separated from the slab 40 by corresponding insulating layers 48. It is to be understood that the reflecting layer is provided as a reflector that is operable for the wavelength of interest. With this arrangement, radiation of modes above the light line are suppressed. Bragg reflectors or other reflecting device or materials can be employed to achieve requisite suppression for a wavelength to be processed. To facilitate fabrication and handling of the resulting device, a host or sacrificial substrate 50 can be employed, supporting the crystal slab by an intermediate layer 52 of, e.g., an epoxy or other suitable material. Details of fabrication of this device are described below. With this design, a solid state nonlinear optical device is provided having a characteristic nonlinearity that is enhanced by the dielectric properties of the photonic crystal around the nonlinear material.

Now considering a design process for a photonic crystal-based optical device of the invention, whatever photonic crystal and nonlinear material arrangement is selected, the dimensions and periodicity of the dielectric regions of the crystal are selected to obtain the desired spontaneous emission suppression from the nonlinear material. In such a design process, the nonlinear material is first selected for the specified optical device application. The electronic band gap of the selected nonlinear material then sets the corresponding photonic band gap of interest, such that the photonic band gap at least partially, and preferably substantially fully, overlaps the electronic band gap. Frequency-domain electromagnetic simulation is then employed to correspondingly set the periodicity of the photonic crystal to meet this condition. An exemplary simulation tool for setting this design is the MPB simulation package, freely available from the Massachusetts Institute of Technology, Cambridge, Mass.

If desired for a given optical device, the dimensions of a defect cavity are then designed via time-domain electromagnetic simulation, which preserves the photonic band gap at the electronic band gap frequency, while providing strong confinement at the operating frequency. One example suitable simulation tool is the MEEP simulation package freely available from the Massachusetts Institute of Technology, Cambridge, Mass. A waveguide for the operating wavelength can then be designed by, e.g., removal of a linear series of holes, and time-domain electromagnetic simulation is employed to predict losses. A final time-domain electromagnetic simulation of the complete system is then used to calculate the power needed to achieve nonlinear bistable switching behavior for an optical switching device.

Figure 5A:
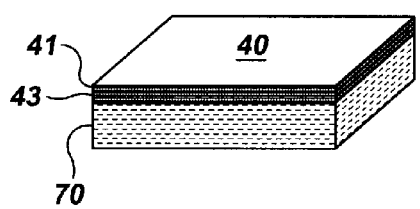
FIGS. 5A-5G are schematic views of steps in an example microfabrication process flow for producing the optical switch of FIG. 4

Turning now to fabrication of the optical devices of the invention, in one example fabrication sequence, the two-dimensional photonic crystal slab and nonlinear material cavity of FIG. 4 are produced by a process shown in FIG. 5 Referring to FIG. 5A, in one example, process, a sacrificial substrate, or handle substrate, 70 is first provided. The sacrificial substrate is employed as a platform for the epitaxial deposition of the photonic crystal medium 38, which here is provided as stack 40 of layers that form a multiple quantum wells of nonlinear material. Given the use of AlGaAs and AlAs as the quantum well nonlinear materials, the substrate can be provided as, e.g., a 325 µm-thick GaAs substrate.

The multiple quantum wells are then epitaxially formed on the sacrificial substrate by, e.g., molecular beam epitaxy, alternating between the AlGaAs and AlAs layers. The thickness of each layer is selected to satisfy the criteria given above for nonlinear materials, e.g., to suppress nonradiative decay. In one example configuration, 78 layers are provided, each having a thickness of about 3 nm, for a total slab thickness of 234 nm.

Figure 5B:
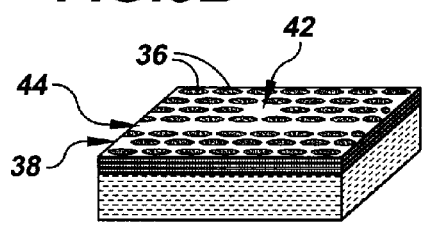

Referring to FIG. 5B, a two-dimensional periodic array of holes is then formed in the layered AlGaAs—AlAs slab. In one example process, electron beam or other suitable lithography and corresponding resist, e.g., PMMA is employed to define the array of holes 36. Given a device operation at a wavelength of 1.55 µm, the hole array is preferably a triangular lattice with a lattice constant of about 775 nm and a hole radius of about 264 nm. With the hole array lithographically defined, it is then patterned into the slab with a suitable anisotropic etch, e.g., a reactive ion etch employing suitable etch species, such as a $Cl_2$/Ar plasma. As shown in FIG. 4 and FIG. 5B, the array of holes includes a cavity 42, consisting of one missing hole, and a one-dimensional defect 44 to provide a waveguide in the crystal slab 38 for coupling input light to the cavity 42.

Figure 5C:
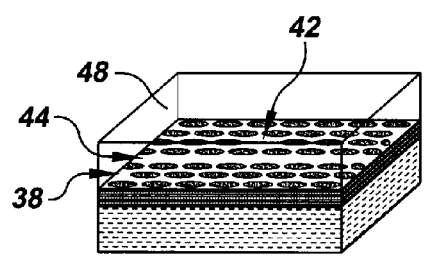

As shown in FIG. 5C, a selected insulator layer, e.g., $Al_2O_3$ is then deposited, e.g., by atomic layer deposition, to conformally coat the exposed surface, including the bottom of the lithographically defined array of holes. The holes are then completely filled, and deposition continues up above the top of the two-dimensional photonic crystal slab 34, to a selected thickness, such as 517 nm.

Figure 5D:
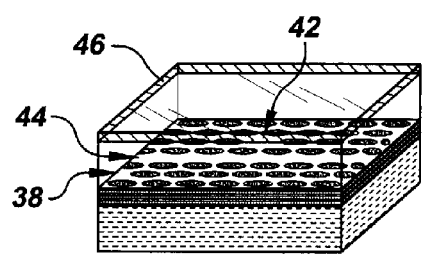
Figure 5E:
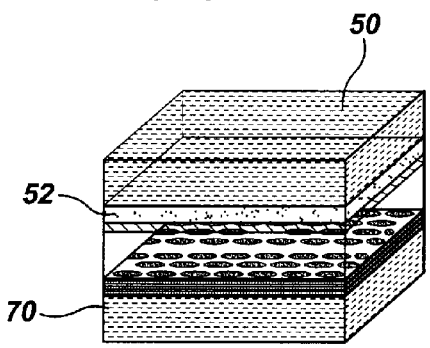

Referring to FIG. 5D, a reflective layer 46, such as a layer of aluminum, is deposited by a suitable vapor deposition technique, e.g., evaporation, with a thickness of at least about five skin depths, e.g., 30 nm. With this reflective layer in place, one side of the photonic crystal slab is provided with complete emission suppression. To complete the other side of the slab, a second host substrate 72 is attached to the device by way of, e.g., an epoxy layer 52 or other suitable layer.

Figure 5F:
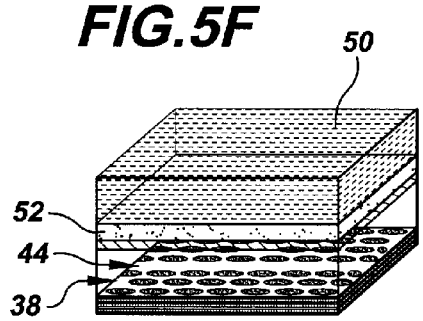
Figure 5G:
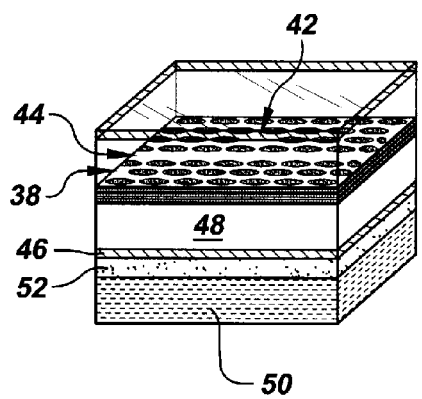

Then as shown in FIGS. 5F-5G, the sacrificial substrate 70 is removed, e.g., with a selected etch stopping on an AlGaAs layer. For example, citric acid can be employed to selectively etch GaAs and stop on AlGaAs. With the sacrificial layer removed, an insulator layer 48 and metal layer 46 can be deposited as described above such that both the top and bottom of the photonic slab are coated with a reflective layer. With this process complete, the device can be connected to suitable optical fibers or other waveguides to couple light through the waveguide of the photonic crystal to the location of the nonlinear cavity in the crystal.

As explained above, to produce a selected nonlinearity-enhanced optical device in accordance with the invention, a dielectric environment is provided around a nonlinear material to suppress the spontaneous emission of the nonlinear material and enhance the nonlinearity in the manner described above. A second example class of dielectric environments to be employed in accordance with the invention is the class of resonators, such as microring resonators.

Figure 6:
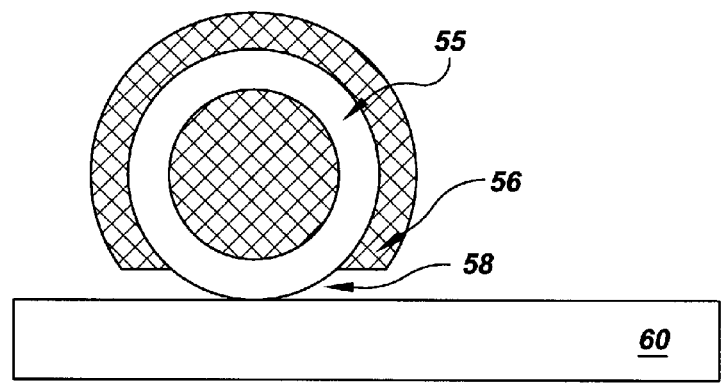
FIG. 6 is a schematic view of an example of a nonlinear microring resonator provided by the invention.

Referring to FIG. 6, in one example configuration of a microring resonator in accordance with the invention, there is provided a ring resonator 55 that is formed of a selected nonlinear material and is nanostructured if necessary to suppress nonradiative decay. The microring dimensions are selected to provide a cavity for modes of interest and to suppress spontaneous emission from the nonlinear material. The nonlinear ring resonator is surrounded by a reflecting surface 56 to further suppress spontaneous emission from the nonlinear material. A portion 58 of the microring is not surrounded by a reflecting surface and instead is disposed at the location of a waveguide 60. This waveguide provides coupling of incident light to the microring for processing by the nonlinear material, and can be addressed by an optical fiber or other device. The microring can be provided, e.g., with the nonlinear material AlGaAs (n=3.3), a thickness of 0.6 µm, a bending radius of 7 µm, and a width of either 0.7 µm for single-mode operation, or 3 µm for multi-mode operation.

The invention contemplates a range of adaptations of the photonic crystal and resonator geometries described above. Fabry-Perot resonator structures and other optical cavity configurations can be employed where a nonlinear material is provided for the cavity and the dimensions and environment of the cavity are selected to achieve emission suppression of the nonlinear material. Omnidirectionally reflecting Bragg fibers, know as omniguides, and other such structures can also be employed.

EXAMPLE 1

The two-dimensional photonic crystal structure of FIG. 2 is analyzed for a two-dimensional triangular lattice of air holes in a dielectric medium of doped Si ($\in$=13). The nonlinear material provided at the center of the structure is provided as a GaAs—AlGaAs single quantum well. The periodicity of the photonic crystal is 331 nm, and the radius of the air holes is 158 nm.

Figure 7A:
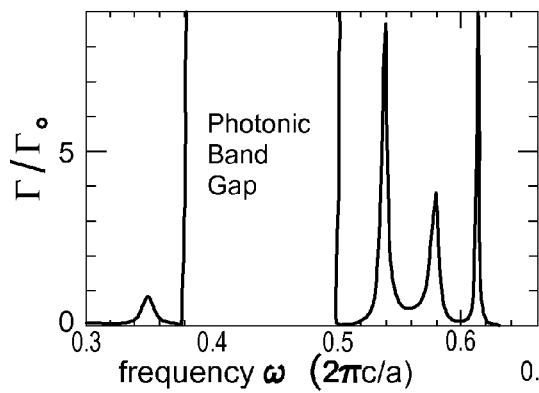
FIGS. 7A-7C are plots of relative enhancement of local density of states, Kerr enhancement at 200 K, and Kerr enhancement at 225 K, respectively, for the structure of FIG. 2.

FIG. 7A is a plot of the relative enhancement of the TM local density of states for the structure, as-measured in the time-domain simulation rate of emission, $\Gamma$, normalized by the emission rate in vacuum, $\Gamma_o$. Inside the photonic band gap of the structure, there is substantial but slightly incomplete suppression of emission. Outside the band gap, there is an enhancement of spontaneous emission because the density of states of the nonlinear material is shifted to frequencies surrounding the band gap. For an atom polarized in the direction out of the two-dimensional plane of the crystal, only the TM polarization need be considered. This plot indicates that within the band gap of the crystal, the spontaneous emission is quite substantially decreased.

This determination of the enhancement of the local density of states for the structure was obtained in MEEP. The spontaneous emission of a dipole placed at the middle of the structure was first determined, and then divided by the spontaneous emission rate in vacuum. The resulting values for $T_1$ and $T_2$ were then calculated numerically to solve for the enhancement factor plot of FIG. 7A.

Figure 7B:
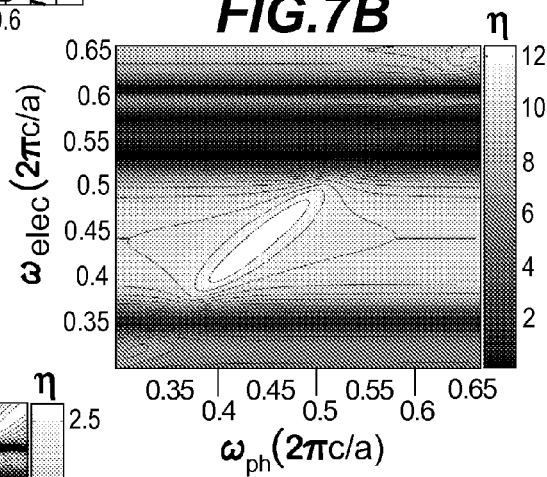

FIG. 7B is a contour plot of the Kerr enhancement, $\eta$, of the real part of the Kerr nonlinear susceptibility, $\chi^{(3)}$, that is achieved in accordance with the invention by suppression of spontaneous emission in the structure of FIG. 2, as defined by expression (4) above. This enhancement is shown as a function of probe frequency, $\omega_{ph}$, and electronic transition frequency, $\omega_{elec}$, for the GaAs—AlGaAs single quantum well nonlinear material, assuming $\gamma_{phase}$=0.025($2\pi C/\alpha$), where $\alpha$ is the period and c is the speed of light. The temperature is given as 200 K, with $0.1\gamma_{phase}$=$10\Gamma_{nr}$=$\Gamma_{rad}$. A value of $10\Gamma_{rad}$ is given for $\gamma_{phase}$. This results in an enhancement in the real part of the Kerr susceptibility up to a factor of 12, close to the predicted maximum enhancement factor of 10.48 in the regime of large detunings, where $\Delta T_2 \gg 1$.

Figure 7C:
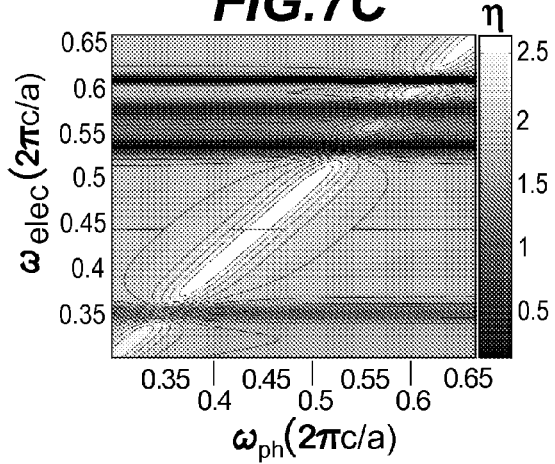

FIG. 7C is a contour plot of the Kerr enhancement, $\eta$, of the real part of the Kerr nonlinear susceptibility, $\chi^{(3)}$, in the structure of FIG. 2, also as a function of probe frequency, $\omega_{ph}$, and electronic transition frequency, $\omega_{elec}$, for the GaAs—AlGaAs single quantum well nonlinear material, assuming $\gamma_{phase}$=0.025($2\pi c/\alpha$), where $\alpha$ is the period and c is the speed of light. The temperature is given as 225 K, with $0.1\gamma_{phase}$=$\Gamma_{nr}$=$\Gamma_{rad}$. A value of $10\Gamma_{rad}$ is again given for $\gamma_{phase}$. This results in an enhancement in the real part of the Kerr susceptibility up to a factor of 2.5, close to the predicted maximum enhancement factor of 1.91 in the regime of large detunings, where $\Delta T_2 \gg 1$.

EXAMPLE 2

The two-dimensional photonic crystal structure of FIG. 3 is analyzed for a 7×7 square lattice of dielectric rods of Si, having ∈=12.25, with a radius of 0.25α, where α is the period of the lattice. The rods are surrounded by air. The middle defect site is provided with a radius of 0.35α. A nonlinear material, namely, a CdSe nanocrystal, is provided at the defect site.

Figure 8A:
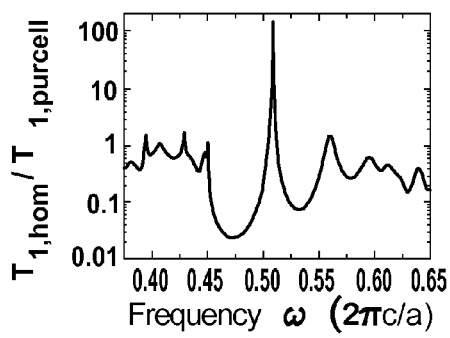
FIGS. 8A-8B are plots of spontaneous emission enhancement and Kerr enhancement, respectively, for the structure of FIG. 3.

FIG. 8A is a plot of a numerical calculation of the enhancement of spontaneous emission for the structure, given as the ratio of the rate of emission of the nonlinear material in the photonic crystal, $T_{1,purcell}^{-1}$, divided by the emission rate in vacuum, $T_{1,vac}^{-1}$, as a function of frequency.

Figure 8B:
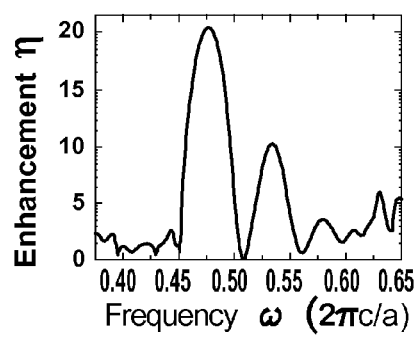

Given a value of $T_2 \approx 0.13$ fs at room temperature for a CdSe nanocrystal at the defect site, there is determined the enhancement, η, of the real part of the Kerr nonlinear susceptibility, $\chi^{(3)}$, in the structure of FIG. 3, as a function of electronic transition frequency, $\omega_{elec}$, when probed at a frequency, $\omega_{ph}=0.508(2\pi c/\alpha)$, the cavity's resonant frequency. FIG. 8B is a plot of the enhancement at room temperature. This shows that an enhancement in nonlinearity by up to a factor of 21 is provided by the structure. This factor is less than the theoretical maximum value of 40 obtained from the expression for maximum nonlinear enhancement taking the quotient of $T_1$ values with and without complete spontaneous emission suppression for this material because the spontaneous emission is suppressed only by a factor of about 43, as shown in FIG. 8A. A much bigger photonic crystal, suppressing the spontaneous emission more strongly, would approach the theoretical maximum enhancement.

EXAMPLE 3

The photonic crystal structure of FIG. 4 is configured and operated as a Kerr nonlinear switch, with the AlGaAs multiple quantum well structure providing a photonic crystal microcavity as described above. This structure enables the operation of an ultra-low power photonic crystal switch. For operation at the telecommunication wavelength of 1548 nm, an alloy of $Al_xGa_{1-x}As$ is very well suited as the nonlinear material because many alloys in this family are characterized by a band gap energy that is greater than twice the photon energy, a requirement for switching, as described above. This condition results in very low two-photon absorption, and a switching figure of merit, ξ, that is large enough to enable switching.

Given the two-dimensional multiple quantum well structure of FIG. 4 and FIG. 5, the alternating layers are formed of $Al_{0.18}Ga_{0.82}As$ and $Al_{0.7}Ga_{0.3}As$. The overall criterion necessary to achieve switching for this structure are based on the geometric parameters of the structure: a photonic crystal period of 300 nm, a hole radius of 120 nm, a total thickness of the layered slab of 180 nm, a defect cavity radius of 300 nm, a quality factor of 18400, a modal volume of 0.0716 μm³, an insulator thickness of 30 nm, and a metal thickness of 20 nm.

Based on these geometric factors, it is found that 5800 photons are required to achieve switching for the design of FIGS. 4 and 5. The total amount of energy required for the switching with the structure is 0.74 fJ. This compares very favorably to state of the art silicon nanophotonics, having required switching energies, even in the best case, on the order of 75 fJ. In addition, for a switching rate of 30 GHz, 14% of the cavity energy is consumed, resulting in a loss to heat of only 0.1 fJ, or 800 photons, per pulse.

To achieve single photon switching with this design, for application to quantum computing, the switching energy must be reduced by a factor of 5800, corresponding to the number of photons used in the 30 GHz switching design given just above. To achieve this single photon switching, quantum dots, rather than a multiple quantum well structure, are provided embedded in an insulating matrix. This increases the nonradiative lifetime of electrons in the quantum dots to about 1 μs, thus increasing the Kerr susceptibility by another factor of 2. A three-dimensional photonic crystal can be employed to more strongly suppress emission at the crystal band gap wavelength. An additional enhancement of up to a factor of 25 is possible for an ideal photonic crystal, given a 39:1 ratio between nonradiative:radiative lifetimes, and at least a 400:1 suppression of the radiative decay. Finally, the quality factor and modal volume can be adjusted. A quality factor of 328,000 and a model volume of $(\lambda/2n)^3$ provides the requisite adjustments.

EXAMPLE 4

Figure 9:
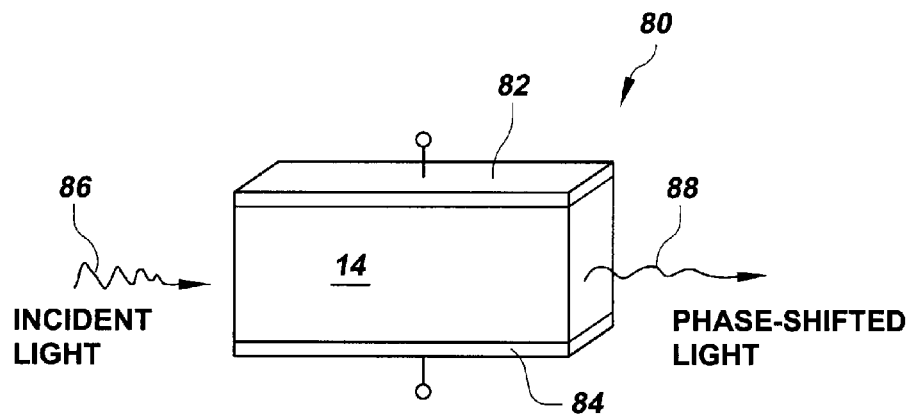
FIG. 9 is a schematic view of an example electrooptic modulator provided by the invention.

Referring to FIG. 9, there is provided by the invention an enhanced-nonlinearity electrooptic phase shifting device, or modulator, 80. The electrooptic modulator includes a three-dimensional photonic crystal 14, as described above, having electrodes 82, 84 provided for imposing an electric field to change the index of refraction of the modulator. This change in refractive index causes light 86 that is incident at the modulator to be phase-shifted for producing output phase shifted light 88. The modulator is formed of a three-dimensional photonic crystal of GaAs having a three dimensional array of air holes. The nonlinear material GaAs thereby is employed as the medium of the crystal. The photonic band gap of the structure is tuned to the electronic band gap energy of 1.52 eV of the GaAs material, corresponding to photons of wavelength λ=816 nm.

The refractive index of GaAs at that wavelength is about 3.4, setting the bottom of the gap at $\omega \approx 0.5(2\pi c/\alpha)$, corresponding to a crystal period of approximately half the wavelength, or 406 nm. Cooling of this structure to about 200 K results in an enhancement in the effective nonlinear coefficient of 10.51. Thus, with an effective nonlinear coefficient of 0.0068 esu, an applied field E=0.1 sV/cm=3000 V/m results in an index change $\Delta n = 6\pi\chi^{(3)}|E|^2/n_o = 0.000377$.

Because $\Delta\phi = 2\pi d \Delta n/\lambda$, a π phase shift can be obtained with a modulator length $d=\lambda/(2\Delta n)=1.1$ mm. Here the modulator length is defined as the actual length times the filling fraction of electrooptic material, typically on the order of 0.5. An increase in the applied field by a factor of 10 leads to a factor of 100 decrease in the required modulator length. Other functionality can be further be implemented. For instance, amplitude modulation can be achieved by splitting a beam into two paths, and sending half through the electrooptic switch. With this arrangement, there can be controlled whether constructive or destructive interference occurs, thus altering the amplitude of the outgoing light.

EXAMPLE 5

Nonlinear optical processes can lead to higher harmonic generation, in which light at one frequency is converted to light at some multiple of that frequency. For example, a Kerr nonlinearity in which material polarization has a term ~$E^3$ leads to generation of 3ω from ω. This process can be exploited for frequency conversion of signals and sources. In general, to achieve higher harmonic generation, two propagating modes are caused to interact in a nonlinear medium.

Figure 10:
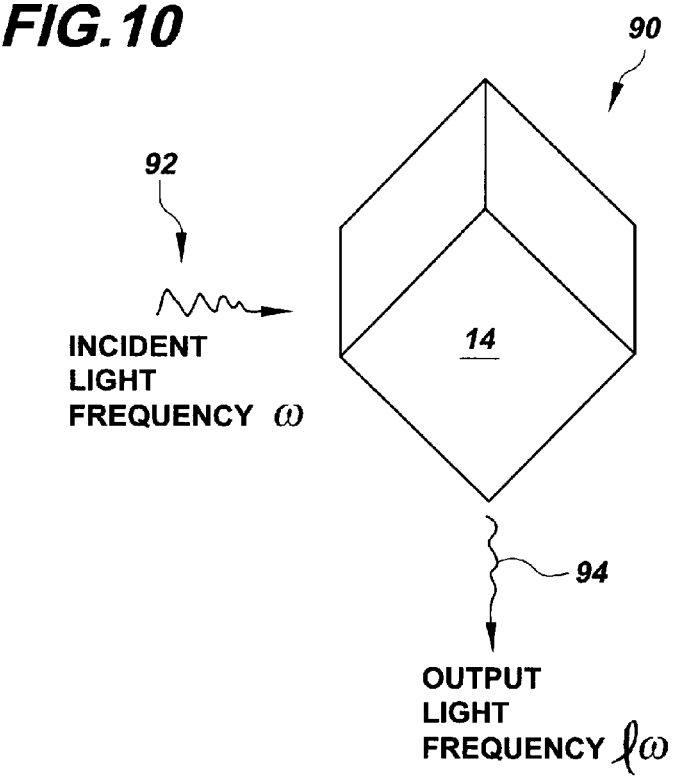
FIG. 10 is a schematic view of an example higher harmonic frequency converter provided by the invention.

Referring to FIG. 10, the invention provides an optical device 90 for converting input light 92 at frequency ω to output light 94 at a higher harmonic frequency lω, where l is an integer≧2. Here a three-dimensional photonic crystal having a cavity with a nonlinear material as in FIG. 4 is employed. This results in a decrease by one order of magnitude in the critical input power required by conventional harmonic generators.

With this discussion, it is shown that the invention provides techniques and device designs for systematically imposing the Purcell effect to tailor the optical nonlinearity of a selected optical device. A wide variety of nonlinear materials, including semiconductors and insulators, provided in a range of optical cavity, resonator, photonic crystal configurations, can be configured to operate as optical devices having nonlinearities that are a priori designed to be greater than the inherent nonlinearity that is characteristic of the materials. A wide range of optical device operations and configurations are thereby made realizable with operational capabilities not previously attainable. All-optical signal processing devices having operating powers and switching times that are orders of magnitude smaller than those corresponding to traditional nonlinear optical devices are thus attainable.

It is recognized, of course, that those skilled in the art may make various modifications and additions to the embodiments described above without departing from the spirit and scope of the present contribution to the art. Accordingly, it is to be understood that the protection sought to be afforded hereby should be deemed to extend to the subject matter claims and all equivalents thereof fairly within the scope of the invention.

We claim:

1. An optical device comprising:
   a solid state nonlinear material comprising a nanostructured extent, in at least one dimension, that is less than about 10 nm, and having an electronic band gap, $E_{Gap}$, that is at least about twice as large as an energy of a photon with a wavelength, $\lambda$, equal to an operational wavelength of the device, such that:

$$E_{Gap} \geq 2\frac{hc}{\lambda},$$

where h is Plank's constant, c is the speed of light, and $\lambda$ is the operational wavelength of the optical device, the nonlinear material further being characterized by a switching figure of merit, $\xi$, having a value that is at least about $2\pi$, such that:

$$\xi = Re\chi^{(3)}/Im\chi^{(3)} \geq 2\pi,$$

where $Re\chi^{(3)}$ is nonlinear susceptibility real part and $Im\chi^{(3)}$ is a nonlinear susceptibility imaginary part;
   a dielectric structure around at least one dimension of the nonlinear material in a geometric arrangement having a characteristic photonic band gap that at least partially overlaps the electronic band gap of the nonlinear material; and
   at least one waveguide disposed at the dielectric structure in sufficient proximity with the nonlinear material for coupling light to the nonlinear material and including input and output ports for directing incident light to the nonlinear material and for directing processed light away from the nonlinear material.

2. The optical device of claim 1 wherein the nonlinear material is characterized as a Kerr nonlinear material.

3. The optical device of claim 1 wherein the nonlinear material is characterized as a Pockels material.

4. The optical device of claim 1 wherein the nanostructured extent of the nonlinear material is provided by a quantum well structure of the nonlinear material.

5. The optical device of claim 1 wherein the nanostructured extent of the nonlinear material is provided by a multiple quantum well structure of the nonlinear material.

6. The optical device of claim 1 wherein the nanostructured extent of the nonlinear material is provided by quantum dot partitioning of the nonlinear material.

7. The optical device of claim 1 wherein the nanostructured extent of the nonlinear material is provided by a quantum wire structure of the material.

8. The optical device of claim 1 wherein the nonlinear material comprises a semiconductor.

9. The optical device of claim 1 wherein the nonlinear material comprises an alloy of $Al_xGa_{1-x}As$.

10. The optical device of claim 1 wherein the nonlinear material comprises a III-V semiconductor.

11. The optical device of claim 1 wherein the nonlinear material comprises a II-VI semiconductor.

12. The optical device of claim 1 wherein the nonlinear material comprises lithium niobate.

13. The optical device of claim 1 wherein the nonlinear material comprises gallium nitride.

14. The optical device of claim 1 wherein the nonlinear material comprises a semiconductor doped glass containing cadmium selenide.

15. The optical device of claim 1 wherein the dielectric structure comprises a cavity.

16. The optical device of claim 1 wherein the dielectric structure comprises a resonator.

17. The optical device of claim 16 wherein at the resonator comprises a microring resonator.

18. The optical device of claim 1 wherein the dielectric structure comprises a photonic crystal having a periodic arrangement of high-dielectric regions and low-dielectric regions.

19. The optical device of claim 18 wherein the photonic crystal comprises a one-dimensional photonic crystal.

20. The optical device of claim 18 wherein the photonic crystal comprises a two-dimensional photonic crystal.

21. The optical device of claim 18 wherein the photonic crystal comprises a three-dimensional photonic crystal.

22. The optical device of claim 18 wherein the nonlinear material is disposed at a low-dielectric region of the photonic crystal.

23. The optical device of claim 18 wherein the nonlinear material is disposed at a high-dielectric region of the photonic crystal.

24. The optical device of claim 18 wherein the nonlinear material is disposed at an interior site of the photonic crystal as a region having an extent that is a defect in the periodic arrangement of the crystal.

25. The optical device of claim 18 wherein the nonlinear material is disposed as a resonant cavity in the photonic crystal.

26. The optical device of claim 18 wherein the waveguide is disposed in the photonic crystal.

27. The optical device of claim 26 wherein the waveguide comprises a one-dimensional defect in the periodic arrangement of the photonic crystal.

28. The optical device of claim 18 wherein the photonic crystal is configured with reflecting surfaces at edges of the crystal.

29. The optical device of claim 18 wherein the nonlinear material is disposed as substantially all high-dielectric regions of the photonic crystal.

30. The optical device of claim 29 wherein the nonlinear material is provided as a multiple quantum well structure.

31. The optical device of claim 1 wherein the waveguide comprises at least one optical fiber.

32. The optical device of claim 1 wherein the nonlinear material is configured as an optical switch.

33. The optical device of claim 1 wherein the nonlinear material is configured as an electrooptical phase shifter.

34. The optical device of claim 1 wherein the nonlinear material is configured as a higher-harmonic generator.

35. An optical device comprising:

a solid state nonlinear material at a temperature of less than about 77 K, and having an electronic band gap, $E_{Gap}$, that is at least about twice as large as an energy of a photon with a wavelength, $\lambda$, equal to an operational wavelength of the device, such that:

$$E_{Gap} \geq 2\frac{hc}{\lambda},$$

where h is Plank's constant, c is the speed of light, and $\lambda$ is the operational wavelength of the optical device, the nonlinear material further being characterized by a switching figure of merit, $\xi$, having a value that is at least about $2\pi$, such that:

$$\xi = Re\chi^{(3)}/Im\chi^{(3)} \geq 2\pi,$$

where $Re\chi^{(3)}$ is nonlinear susceptibility real part and $Im\chi^{(3)}$ is a nonlinear susceptibility imaginary part;

a dielectric structure around at least one dimension of the nonlinear material in a geometric arrangement having a characteristic photonic band gap that at least partially overlaps the electronic band gap of the nonlinear material; and at least one waveguide disposed at the dielectric structure in sufficient proximity with the nonlinear material for coupling light to the nonlinear material and including input and output ports for directing incident light to the nonlinear material and for directing processed light away from the nonlinear material.

* * * * *